M. H. KURYLA.
PROCESS OF MAINTAINING FILTERS IN FILTERING CONDITION.
APPLICATION FILED OCT. 30, 1915.
1,302,813.
Patented May 6, 1919.
2 SHEETS—SHEET 1.
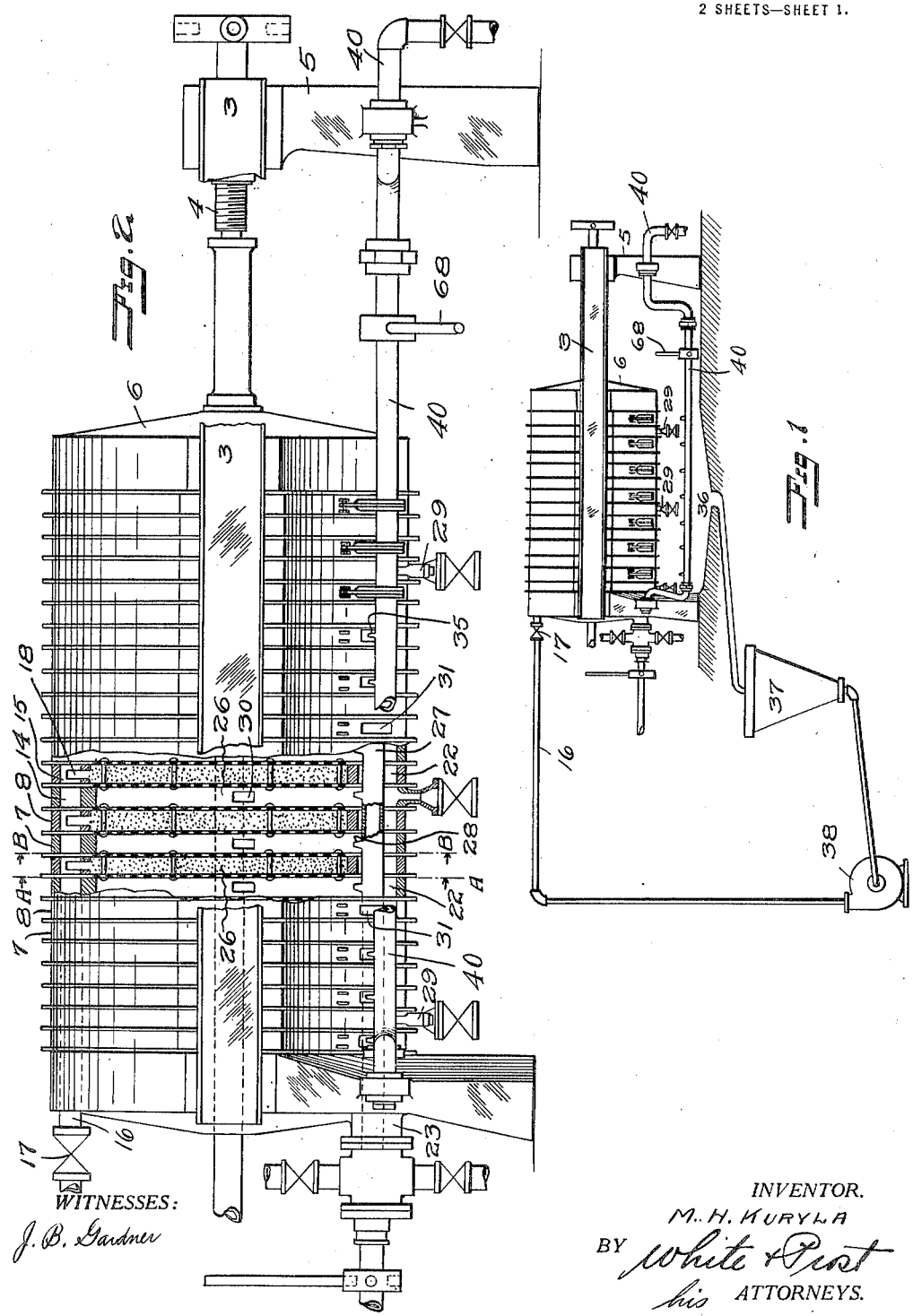
WITNESSES:
J. B. Gardner
INVENTOR.
M. H. KURYLA
BY White & Prest
his ATTORNEYS.

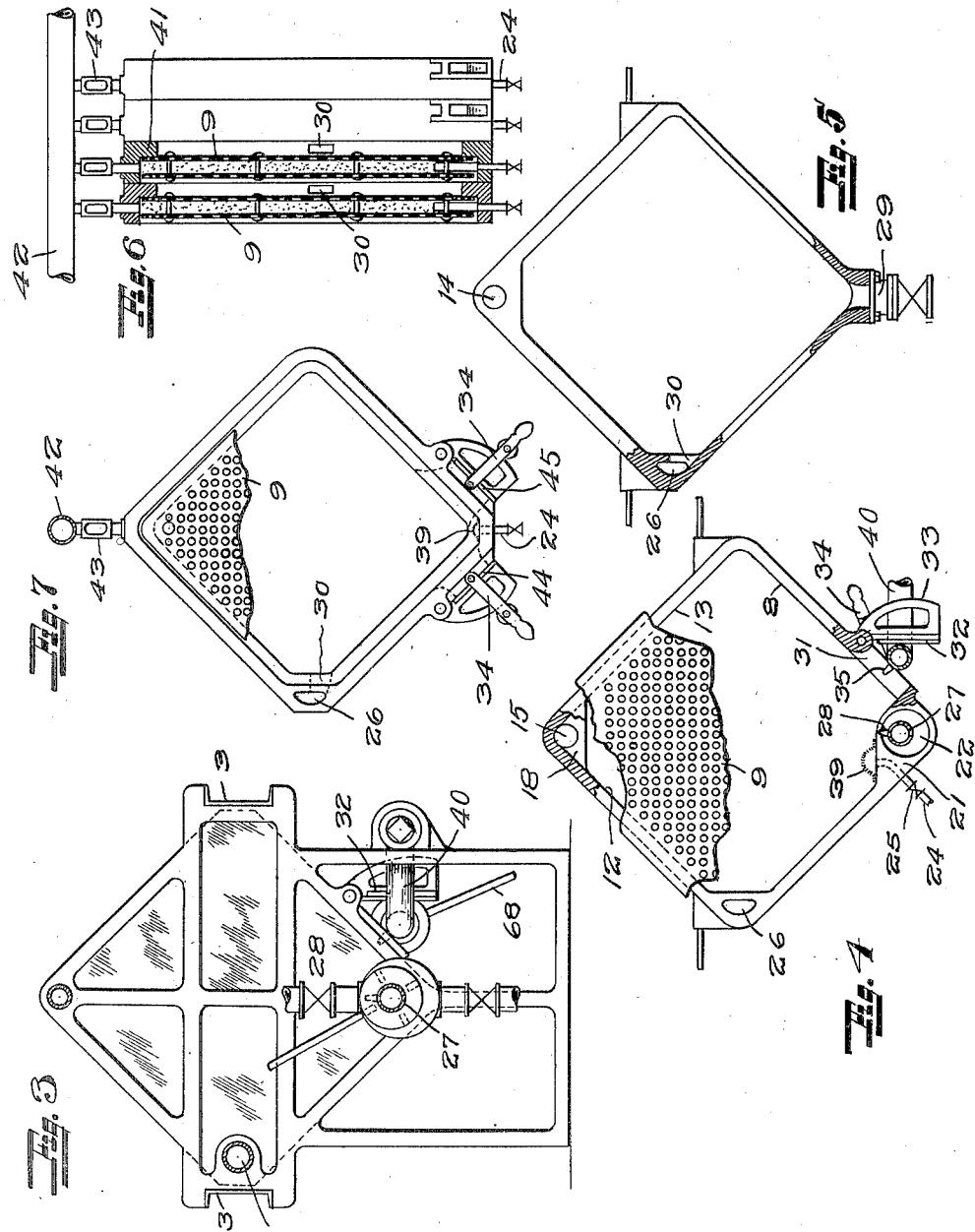

UNITED STATES PATENT OFFICE.

MICHAEL H. KURYLA, OF SAN FRANCISCO, CALIFORNIA, ASSIGNOR TO MERRILL METALLURGICAL COMPANY, OF SAN FRANCISCO, CALIFORNIA, A CORPORATION OF CALIFORNIA.

PROCESS OF MAINTAINING FILTERS IN FILTERING CONDITION.

1,302,813.            Specification of Letters Patent.        Patented May 6, 1919.

Application filed October 30, 1915. Serial No. 58,790.

*To all whom it may concern:*

Be it known that I, MICHAEL H. KURYLA, a citizen of the United States, and a resident of the city and county of San Francisco, State of California, have invented certain new and useful Processes of Maintaining Filters in Filtering Condition, of which the following is a specification.

The invention relates to metallurgical and comparable filters and particularly to a process of maintaining such filters in efficient filtering condition.

An object of the invention is to provide a process of maintaining a mass filtering medium in a filter in an efficient filtering condition.

Another object of the invention is to provide a process of maintaining a filter in efficient filtering condition without taking down the filter or separating any of the parts thereof.

The invention possesses other advantageous features, some of which, with the foregoing, will be set forth at length in the following description, where I shall outline in full one form of the invention which is carried out by the use of the particular apparatus which I have selected for illustration in the drawings accompanying and forming part of the present specification. It is to be understood that I do not limit myself to such for, because my invention may be embodied in a multiplicity of forms, each being a species of my invention. It is also to be understood that by the claims succeeding the description of my invention, I desire to cover the invention in whatever form it may be embodied. The present invention is applicable to all forms of filters now on the market and in the drawings, I have shown it as applied to one specific form, but the invention is not limited in its application to the specific form shown.

In accordance with my invention, I employ a mass filtering medium usually consisting of sand or some other granular or finely divided or permeable material, which is firmly packed in the filter to form a filtering mass so that it possesses the advantageous features of porous brick, without any of its disadvantages. The mass filtering medium which I prefer to employ is such as to be unaffected by the solution to be filtered. It can withstand cutting and corrosive actions, is not affected by high temperatures or pressures, and its nature can be suited to the properties of the material to be filtered. The fineness of the mass filtering medium may be proportioned to the desired filtration to be performed, and its porosity may be varied while maintaining its uniformity.

Filtering a mixture through a mass filtering medium for any great length of time, necessarily results in the deposit throughout the filtering mass of some of the fine or slimy particles of the mixture being filtered, so that the mass becomes clogged and cannot be further used as a filtering medium until it has been cleaned in some way. In some instances it has been proposed to clean such filtering mediums by washing them in the filter by a reversed flow of washing fluid or otherwise. Under circumstances encountered in filtering metallurgical and comparable solutions, however, this method of cleaning a mass filtering medium is insufficient and practically impossible and in consequence, a mass filtering medium has not heretofore found general use in such processes.

I have devised a process for maintaining such mass filtering medium in an efficient condition, which renders general the use of a mass filtering medium in metallurgical and comparable filtering operations. This process in its preferred form consists essentially in removing the fouled packed mass filtering medium from the filter by the impinging action of streams of water or other fluid directed against the packed mass, in cleansing it outside of the filter and then returning it, evenly distributing and packing it in proper position within the filter. The invention in its complete form also contemplates the removal of the cakes of solid and semi-solid material, which form during the filtering operation, from the filter, without separating the parts of the filter, so that it is not necessary to separate the parts of the filter either for removing and replacing the filtering medium or for removing the cakes. The cakes of solid and semi-solid material have been removed heretofore without separating the parts of the filter, but it was necessary to separate the parts of the filter to renew or repair the filtering mediums. By the use of this invention, however, the separation of the parts of the filter becomes unnecessary, thereby effecting a great saving in time and labor.

By providing a method of maintaining a mass filtering medium in an efficient filtering condition, it is possible to employ such filtering medium in numerous processes in which its use was heretofore prohibited.

In the cyanide process, in which the ground ore is mixed with cyanide solution to accomplish the solution of the valuable metal particles and the mixture then filtered to separate the liquid from the solid portion, sand may be employed as the mass filtering medium.

The present process may also be employed efficiently in the process of aluminum manufacture. In aluminum manufacture, the hot mass or pulp containing sodium aluminate liquid and red mud is filtered to separate the liquid from the mud. Heretofore, filter cloths have been employed for accomplishing this filtration, but the action of the hot caustic liquor on the cloths is so destructive that the cloths must be changed very frequently, involving an expense in time and materials, and occasioning objectionable leakage about the joints. By means of the process of my invention, a mass filtering medium may be employed and such medium is selected which is not affected by the liquor and this medium, when fouled, may be removed from the filter and cleaned without dismembering the filter after which the cleaned mass may again be introduced into the filter. Similarly, there are other industries where hot solutions or caustic or acid chemicals are used or generated during the process which would weaken or destroy the usual filtering medium and which the use of this process will obviate.

In the accompanying drawings:

Figure 1 is an elevation of one form of filter, showing means for removing, washing and reintroducing the mass filtering material.

Fig. 2 is a side view of the filter partly in section showing means for sluicing both the mass filtering material and the cakes of solid and semi-solid material from the filter.

Fig. 3 is an end view of the filter shown in Fig. 2.

Fig. 4 is an end view of a mass filtering medium frame taken on the line A—A Fig. 2, the foraminated plate which retains the filter mass in the frame being partly broken away, and parts of the frame being broken away.

Fig. 5 is an end view of one of the container frames, taken on the lines B—B Fig. 2.

Fig. 6 is a side view partly in section of a modified form of filter in which the mass filtering medium frame and container frame are formed integral.

Fig. 7 is an end view of the filter frames shown in Fig. 6, part of the foraminated plate being broken away.

The filter may be of any desirable construction of either the pressure gravity or vacuum types to accomplish the ends sought by this invention, and the filtrate may pass completely through the mass filtering material frame and be discharged from the farther side thereof, or it may pass into and through the mass filtering material in the manner shown in the embodiment illustrated in the drawings.

By providing a process for readily removing or introducing the mass filtering medium without taking apart or separating various parts of the filter, many possibilities in the filter construction and operation are presented. Heretofore, it has been necessary to dismember the filter when new filter cloths were required and when the solution being filtered was of such nature that it produced a very deleterious action on the filter cloths, it was necessary to dismember the filter or parts thereof very often, a process which is expensive both in time and material. With the use of the present process, a mass filtering medium may be employed and the deleterious effect of the solutions in wearing the filtering medium may be entirely overcome and it is necessary to remove and clean the medium only when it becomes clogged with fine or slimy particles or otherwise exhausted. The removal of the medium from the filter, its thorough cleaning and reintroduction into the filter, is accomplished rapidly and efficiently and without the dismemberment of the filter or parts thereof.

It is understood that in metallurgical and comparable filters, the fluid, solution or mixture to be filtered is introduced into a chamber containing a filtering medium, that the filterable portion of the fluid, solution or mixture passes through the filtering medium and that the solid and semi-solid portions of the mixture build up in the form of a cake on the surface of the filtering medium. In the present drawings, I have shown the invention as applied to a pressure filter, in which the chamber or chambers into which the material to be filtered is fed, are closed chambers and in which pressure is produced for forcing the filterable material through the filter medium or filter frame, but filtration may be accomplished by a difference in pressure produced in any desirable manner, such as by reducing the pressure of the filtrate effluent side of the filter.

The filter press shown in Figs. 2 and 3 comprises a suitable frame, consisting in part of the side rails or channels 3, upon which separate units of the press are mounted. The units are pressed tightly together by means of the screw 4 bearing in the standard 5 and pressing against the end plate 6. The press comprises a plurality of units of different construction alternately arranged, the units 7 constituting the container frames and the units 8 constituting the filter plates or sand or granular material frames. The container frame 7 comprises preferably a rectangular structure entirely open on its interior, for the reception of the material to be filtered. The mass filtering medium frame 8 comprises a similarly shaped structure having screens or foraminous partitions 9 or other filter mass or sand retaining means arranged at the opposite sides thereof. These foraminous partitions are preferably held in place on the frames by rivets passing through both plates or partitions and holding them against the frame. The frames 8 are filled with sand or other mass filtering medium and the holes in the foraminous plates are of such size that the packed sand or mass is retained in the frames.

The present invention contemplates a process for filling the frames 8 with sand or other filtering medium which packs in the frame to produce a filter plate for removing the medium from the frame, for introducing the material to be filtered into the container frames, for discharging the filtered liquid and for removing the cake of solid or semi-solid material from the container frames, all without separating the various units of the filter. The frames, which when filled with mass filtering medium become the equivalent of filter plates or leaves, are preferably arranged so that when the filtering medium is introduced into the frame 8, it flows to all portions of the frame and completely packs the space therein. For this reason the frame is arranged so that an angle or apex of the frame lies above the level of the rest of the frame, or in other words, the sides of the frame are inclined to the horizontal. The filtering medium is introduced at the upper apex or angle of the frame, and on account of the slope of the upper side walls 12—13 of the frame, the medium may flow to all parts of the frame, thereby obviating any large or material voids. In the construction shown in Figs. 2 to 5 inclusive, each frame 7 and 8 is provided with an opening 14—15 respectively extending therethrough, which, when a series of frames are put together in a filter press, makes a continuous channel or passage extending for the length of the press. This channel is preferably closed at one end and is connected at the other end to a conductor or pipe 16 provided with a valve 17. Passing through the wall of the frame 8 is a passage 18, which connects the channel formed by the alined openings 14—15 with the interior of the frame 8. When it is desirable to fill the frames 8, a mixture of the filtering medium and fluid (air, gas or liquid), is flowed into the channel from the pipe 16, whence it flows into the frames 8, the medium completely filling and packing tightly in the frames. The fluid flows through the foraminous plates 9 into the frames 7, whence it is discharged from the press through the valve controlled outlets 29. When the frames have become packed with the mass filtering medium the valve 17 is closed. That portion of the container frame 7 lying below the opening 14 is preferably thicker than that portion of the frame 8 lying below the opening 15, so that the interior of the frame 8 extends to a higher level than the interior of the container frame. This difference in height of the interior of the frames allows the mass filtering medium in the frame to shrink and settle without falling below the level of the liquid in the container frame, and thereby prevents the entry of the material to be filtered into the frame 8 above the filtering mass therein and the consequent forming of a cake within the frame 8.

At its lower corner or apex the filter plate is provided with a thickened portion 21 through which extends an opening 22, through which all of the container frames are interconnected when the filter is assembled. The material to be filtered is introduced into the container frames through the conductor 23, which is alined with the openings 22 in the filtering medium frames. The filterable material passes through the medium and discharges from the frames, in the present instance, through the conductors 24 arranged adjacent the bottom of the frames, which conductors are provided with valves 25. A screen 39 placed over the inlet end of the conductor 24 prevents the medium from discharging with the filtrate. Formed in the side corner of each frame is an opening 26, and when a plurality of frames are assembled in a filter press, these openings form a continuous passage extending for the length of the filter. Each container frame is provided with a passage 30 connecting the interior of the frame with the passage formed by the alined openings 26, and after the cakes of solid and semi-solid material have been formed in the containers, wash water or solution is introduced into the containers through these passages, for the purpose of removing any valuable liquid remaining in the cake. The liquid for washing the cake may be introduced through any of the other channels which communicate with the container frames.

The illustrated means employed for removing the cakes from the container frame comprises a pipe 27 disposed in the passage formed by the openings 22 and provided with nozzles 28 directed toward the interior of the container frames. Water or other liquids, fluid or gas or mixtures of the same, is forced through the pipe and nozzles against the cake and the cake is cut away by the impinging action of the jets and sluiced out. The pipe 27 is rotatably arranged so that the streams discharging from the nozzles may be directed against all parts of the cake, and the dislodged cake passes through the passage formed by the openings 22 and discharges through the valved conduits 29.

The present process contemplates sluicing the sand or mass filtering medium from the frames 8 when the medium becomes clogged or fouled or otherwise affected to such an extent that renewal or thorough cleansing thereof is advisable. The mass filtering medium may be cleansed after each cycle of cake making, or it may be cleansed after a plurality of cycles of cake making, that is, the filtering medium may be cleansed after each cake is formed, or several cakes may be formed and removed before the filtering medium is cleansed. Each frame 8 is provided at its lower end with an aperture 31, which is normally closed by a gate 32. The gate is preferably provided with a cam 33 on its rear, which is engaged by a lever 34 for holding it in the closed position, and for rapidly opening it. One lever may serve to operate all of the gates at the same time. The sluicing out of the mass filtering medium is accomplished by directing streams of liquid vapor or gas against the packed filter mass. The impinging action of the jets or streams of liquid, gas or vapor striking the packed mass from below, causes the disintegration of the mass and the sluicing of it from the filter. Arranged adjacent the gates and preferably rotatably mounted is a pipe 40 provided with nozzles 35 arranged to discharge streams through the aperture 31 and against the packed mass. The pipe is also mounted so that it may be swung out of the way of the gates when the gates are to be closed and adjacent to the apertures when the gates are opened, and so that it may be moved during the sluicing operation to direct the stream toward the various parts of the interior of the frame. The portion of the pipe which carries the nozzles is rotatably connected to the remainder of the pipe, which is capable of being swung, so that the nozzled portion of the pipe has a motion of rotation and translation and the pipe may be rotated by any suitable means such as the handle 68.

The discharged filtering medium may be cleansed and conducted back to the frames in many ways, and in Fig. 1 I have shown one form of such means. The filtering medium and water discharges from the filter through the apertures 31 and falls into the pit or conduit 36, whence it flows to a hydraulic classifier 37, in which an upwardly directed current carries off the matter which has accumulated in the medium. The cleansed medium settles to the bottom of the classifier, whence it is pumped back into the frames 8 by the pump 38. It is apparent that other means may be employed for separating the accumulated particles from the filtering medium, such as classifiers, washers, beaters or screens.

In Figs. 6 and 7 I have shown a modified form of construction in which the mass filtering medium frame and the container frame are formed integral, the frame being provided with a shoulder 41 at that part which constitutes the container to provide a seat for the foraminous partition and to provide for shrinkage and packing of the medium, as has been heretofore explained. The filtering medium charging means consists of a separate pipe 42, which is connected to the filtering medium chambers by pipes provided with sight feeds 43. In this construction, each frame is provided with two gates 44—45, one closing an opening to the filtering medium chamber and the other closing an opening to the cake chamber, and the medium and cake are sluiced out as has been heretofore described.

By this process the filtering medium is maintained in efficient filtering condition without separating the parts of the filter. Heretofore, the cakes of solid and semi-solid material have been removed without separating the parts of the filter, but such separation has always been necessary to repair or renew the filtering mediums. The present invention not only includes a process of maintaining the filtering medium in efficient filtering condition, but also includes a process, by the practice of which it is not necessary to separate the parts of the filter.

I claim:

1. The process of maintaining a filter employing a plurality of containers containing mass filtering medium in a state of filtering efficiency, which consists in simultaneously sluicing a plurality of cakes of solid and semi-solid residue from filtration from the filter, by the impingement of a plurality of streams of fluid, simultaneously sluicing the mass filtering medium from the plurality of containers by the impingement of streams of fluid, cleansing the removed medium and simultaneously sluicing the cleansed medium into the plurality of containers.

2. The process of maintaining a mass filtering medium in a plurality of containers in a state of filtering efficiency, which consists in simultaneously removing the medium from the plurality of containers, cleansing the removed medium and introducing the cleansed medium simultaneously into the plurality of containers.

3. The process of maintaining mass filtering medium in a plurality of containers in a state of filtering efficiency, which consists in simultaneously removing the medium from the plurality of containers, cleansing the removed medium and sluicing the cleansed medium simultaneously into the plurality of containers.

4. The process of maintaining mass filtering medium in a plurality of containers in a state of filtering efficiency, which consists in simultaneously sluicing the medium out of the plurality of containers by the impingement of streams of fluid, cleansing the removed medium and sluicing the cleansed medium simultaneously into the plurality of containers.

5. The step in the process of maintaining a mass filtering medium in a plurality of containers in a state of filtering efficiency which consists in introducing said medium simultaneously into said plurality of containers.

6. The step in the process of maintaining a mass filtering medium in a plurality of containers in a state of filtering efficiency which consists in sluicing said medium simultaneously into said plurality of containers.

In testimony whereof, I have hereunto set my hand at San Francisco, California, this 23rd day of October, 1915.

MICHAEL H. KURYLA.

In presence of—
H. G. PROST.